(12) United States Patent
Wooden

(10) Patent No.: US 6,213,907 B1
(45) Date of Patent: Apr. 10, 2001

(54) CO-AXIAL SINGLE MODE GEARED NEUTRAL TRACTION TRANSMISSION

(75) Inventor: Elizabeth Irene Wooden, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/422,642

(22) Filed: Oct. 22, 1999

(51) Int. Cl.[7] .................................................. F16H 37/02
(52) U.S. Cl. ........................ 475/216; 475/217; 475/219
(58) Field of Search ................................... 475/216, 217, 475/218, 219, 214, 215, 207, 115, 209

(56) References Cited

U.S. PATENT DOCUMENTS

| | | | |
|---|---|---|---|
| 2,140,012 | * 12/1938 | Hayes | 475/214 X |
| 3,410,146 | * 11/1968 | Nordeen | 475/214 X |
| 4,355,547 | * 10/1982 | Poole et al. | 475/217 |
| 5,238,460 | * 8/1993 | Esaki et al. | 475/216 X |
| 5,254,056 | * 10/1993 | Nakano | 475/185 X |
| 5,607,372 | 3/1997 | Lohr | 475/216 |
| 5,967,931 | * 10/1999 | Hoge et al. | 475/216 |
| 6,045,477 | * 4/2000 | Schmidt | 475/207 |
| 6,110,070 | * 8/2000 | Nagai et al. | 476/8 |

FOREIGN PATENT DOCUMENTS

404327055 * 11/1992 (JP) ..................... 475/216

* cited by examiner

*Primary Examiner*—Charles A Marmor
*Assistant Examiner*—Ha Ho
(74) *Attorney, Agent, or Firm*—Laura C. Hargitt

(57) ABSTRACT

A continuously variable transmission (CVT) has a continuously variable unit (CVU) which has co-axial input and output shafts that are also co-axial with the input and output of the CVT. The CVU includes a toroidal drive having the two input members, two output members and a plurality of transfer members disposed therebetween. The CVT includes a summing differential planetary gear set having one member driven by the CVU input, a second member driven by the CVU output and a third member driving the CVT output. The CVU output is connected through a central compound planetary gear set which is co-axially arranged about the CVU input shaft and positioned between the CVU output members. The CVU input shaft absorbs the normal forces applied through the CVU input members thereby reducing the capacity of some of the rotating bearings.

5 Claims, 1 Drawing Sheet

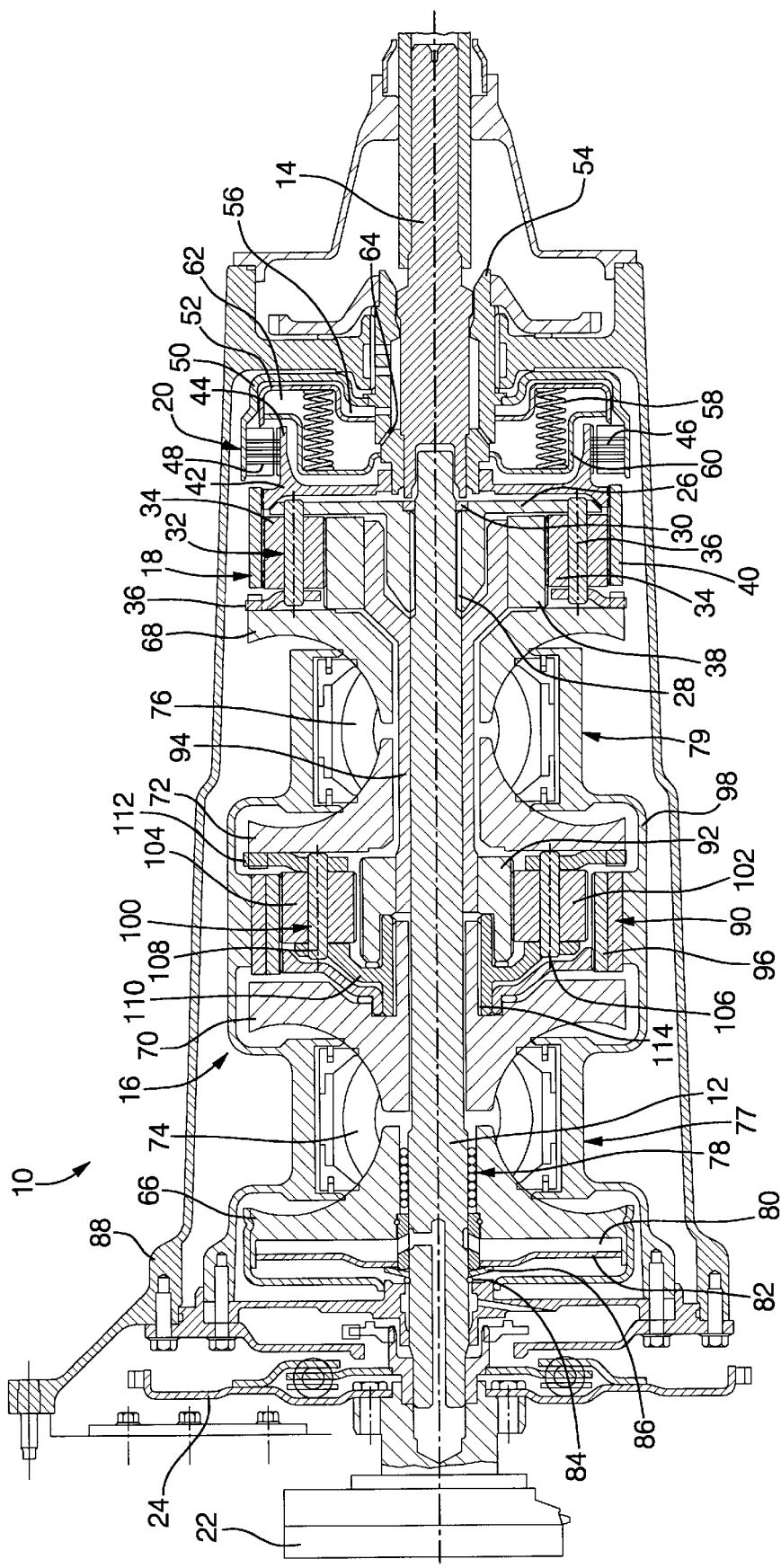

CO-AXIAL SINGLE MODE GEARED NEUTRAL TRACTION TRANSMISSION

TECHNICAL FIELD

This invention relates to continuously variable toric type traction transmissions and more particularly to such transmissions having a geared neutral.

BACKGROUND OF THE INVENTION

Toric or toroidal type traction drive continuously variable transmissions have an input disc, an output disc and a plurality of traction rollers that tractionally engage the input and output discs. Power is transferred through the transmission by the traction drive train between the input discs, output discs and the traction rollers. The transmission ratio between the input discs and the output discs is determined by the angle of operation of the traction rollers relative to the input and output discs. The input discs and output discs are preferably arranged in pairs with the input discs being opposite ends and the output discs being in the center. The input power is connected with the input discs by a toric input shaft and the output power is taken from the output discs by a toric output shaft. The toric output shaft passes through the center of at least one of the input discs.

To accommodate the positioning of the toric output shaft a dual axis design is common. These systems employ a countershaft to connect the two input discs to the power output. The counter shaft is located radially outward of the input and output discs which requires that the transmission have a larger barrel size than required by the radius of the discs.

In order to transmit the power tractionally, the input discs are urged toward each other by mechanical or hydraulic means to establish the proper normal force between the input discs, output discs and the traction rollers and the operating angle of the traction rollers. The most recent designs of these transmissions use electro-hydraulic control systems to apply the normal forces required. These systems permit a more accurate control of the forces needed to establish the correct normal force and the force which establishes the positioning of the traction rollers. In the prior art transmissions of the single cavity designs, the forces applied to the input discs are absorbed or reacted by the transmission housing through rotating bearings. While this is a very effective structurally, it does reduce the overall efficiency of the transmission due to the power loss in the relative rotation of the bearing surfaces.

In order to establish a geared neutral condition, a summing planetary is commonly used. The summing planetary has one member connected with the toric input, one member connected with the toric output and a third member connected with the transmission output. Two types of summing planetary gear sets have been used.

The most commonly used is a simple planetary gear set which has a sun gear, a ring gear and a planetary carrier assembly that includes a plurality of pinion gears meshing with both the sun and ring gears. The toric input is connected with the carrier assembly, the toric output is connected with the sun gear and the transmission output is connected with the ring gear. Depending on the tooth ratio between the sun gear and the ring gear, the transmission output can be stationary (in neutral), rotated in a forward direction or rotated in a reverse direction.

One co-axial arrangement that has been used is shown in U.S. Pat. No. 5,607,372. The co-axial arrangement shown therein includes two sun gears and a carrier assembly having a plurality or interconnected pinion gears which mesh with both the sun gears. The carrier assembly is connected with the toric input, one sun gear is connected with the toric output and the other sun gear is connected with the transmission output which happens to be a planetary gear arrangement and a summing differential. The toric arrangement shown in the above mentioned patent eliminates the need for a counter shaft to provide the input drive to the toric input.

SUMMARY OF THE INVENTION

It is an object of the present invention to provide an improved co-axial toric transmission. In one aspect of the present invention, a toric transmission provided with coaxial input and output shafts. In another aspect of the present invention a planetary gear set is positioned centrally of the output discs to transmit power therefrom. In yet another aspect of the present invention, the toric output is connected with a summing differential external to the toric drive.

In still another aspect of the present invention, the toric input is connected with the summing differential by a central shaft which passes through the centrally located planetary gear set. In a further aspect of the present invention, the normal force applied to the input discs is contained within the input drive members. In yet a further aspect of the present invention, the normal forces applied to the input discs are contained without the use relatively rotating thrust bearings.

The present invention is represented in a single mode, geared neutral, continuously variable transmission. The transmission has a continuously variable unit (CVU) with co-axial toric input and output shafts. The input shaft supplies power from a prime mover, such as an internal combustion engine, to the input discs of the CVU. The input shaft is directly connected with one input disc, through a ball spline, and to the other input disc through the planet carrier of a summing differential gear set. The thrust loads on the CVU input discs are contained within the input shaft.

The power at the input discs is transferred through a plurality of traction rollers to a pair of output discs which are interconnected through the carrier of a compound planetary gear set located between the output discs in concentric relation with the input shaft. The sun gear of the compound planetary gear set is connected through a sleeve shaft with the sun gear of the summing differential. The ring gear of the compound planetary gear set is grounded to the transmission housing. The ring gear of the summing differential is connected through a selectively engageable clutch to a transmission output shaft. The speed and direction of the ring gear of the summing differential, and therefore the transmission output, is determined by the ratio of the CVU. By controlling the angle of the traction rollers relative to the input and output discs, the ratio of the CVU is manipulated. The rotation of the output shaft of the transmission can be forward, reverse or neutral depending on the speed of the individual members of the summing differential.

BRIEF DESCRIPTION OF THE DRAWING

The drawing is a sectional elevational view of a transmission incorporating the present invention.

DESCRIPTION OF AN EXEMPLARY EMBODIMENT

A continuously variable transmission (CVT) 10 has an input shaft 12, an output shaft 14, a continuously variable unit (CVU) 16, a summing differential planetary gear set 18 and a selectively engageable clutch 20. The input shaft 12 is drivingly connected with a conventional engine 22 through a conventional damper assembly 24. The input shaft 12 is drivingly connected with a carrier hub or spider 26 through a spline 28. The carrier hub 26 is limited in rightward axial movement on the shaft 12 by a locating ring 30. The carrier hub 26 is a component of a carrier assembly 32 which is a member of the summing differential gear set 18. The carrier assembly 32 has a plurality of pinion gears 34 that are rotatably mounted on pins 36.

Summing differential gear set also includes a sun gear 38 and a ring gear 40. The pinion gears 34 mesh with both of the ring gear 40 and the sun gear 38, the ring gear 40 is splined to a hub 42 which has an annular toothed portion 44. The annular toothed portion 44 provides an input to the clutch 20 which has a plurality of friction discs 46, splined to the portion 44, a plurality of friction discs 48 splined to a housing 50 and piston 52 slidably disposed in the housing 50. The housing 50 has a sleeve portion 54 that is splined to the output shaft 14.

The piston 52 and the housing 50 cooperate to form an apply chamber 56 that is pressurized by a conventional electro-hydraulic control, not shown, to enforce frictional engagement between the friction discs 46 and 48 and thereby establish a drive connection between the ring gear 40 and the output shaft 14. The piston 52 is urged rightward in the housing 50 by a conventional return spring assembly 58 that is compressed between a centrifugal balance wall 60 and the piston 52. A balance chamber 62 is formed between the piston 52 and the wall 60. The chamber 62 is supplied with hydraulic fluid from the lube circuit through a passage 64. The purpose of the balance chamber 62 is well known. The fluid in the chamber 62 counterbalances the centrifugally generated pressure in the chamber 56 to thereby eliminate an increase in clutch apply pressure due to the rotational speed of the clutch 20.

The CVU 10 has two input discs 66, 68, two output discs 70, 72, a plurality of traction rollers 74 tractionally engaged between the input disc 66 and the output disc 70 and traction rollers 76 tractionally engaged between the input disc 68 and the output disc 72. The traction rollers 74 and 76 are rotatably mounted on respective conventional support assemblies 77 and 79 which are controlled by the electro-hydraulic control system to establish the angle of engagement between the traction rollers 74, 76 and the respective input discs 66, 68 and the output discs 70, 72. As is well known, the angle of engagement of the traction rollers 74, 76 determines the speed ratio between the input discs 66, 68 and the output discs 70, 72. Also those skilled in the art will appreciate that the input discs 66, 68 and the output discs 70, 72 rotate in opposite directions.

The input disc 66 is mounted on the input shaft 12 through a ball spline 78 that permits relative axial movement between the disc 66 and the input shaft 12 while transferring rotation therebetween. The input disc 68 is drivingly connected to the carrier assembly 32 in a manner to be limited in rightward axial movement by the locating ring 30. The input disc 68 rotates with the input shaft 12 and the input disc 66. The input disc 66 is positioned on the input shaft by hydraulic pressure in a chamber 80 formed between the input disc 66 and a piston 82 which is slidably disposed in the chamber 80. Leftward axial movement of the piston 82 is prevented by a locating ring 84 and a spring washer 86. The fluid pressure in the chamber 80 establishes the axial position of the input disc 66 on the input shaft 12. The pressure in the chamber 80 also controls the normal force between the input discs 66, 68, the output discs 70, 72 and the traction rollers 74, 76. As is well known, the normal force determines the maximum torque that can be transferred between the input discs 66, 68 and the output discs 70, 72. By selectively controlling the pressure in the chamber 80 the maximum torque for various input power situations is controlled.

The normal forces are transferred from the input discs 66, 68 to the output discs 70, 72 through the respective rollers 74, 76. The normal forces are extremely high during the transmission of elevated torque levels. Therefore it is necessary to absorb the thrust forces of the input discs. With the present invention, these thrust forces are contained within the input shaft 12 and not transmitted to the transmission housing 88 as is commonly done in the prior art CVTs. The thrust force on the input disc 66 is transmitted to the input shaft 12 by the washer 86 and the locating ring 84. The thrust force of the input disc 68 is transferred to the input shaft 12 through the carrier assembly 32 and the locating ring 30. Since these thrust forces are equal and in opposite directions, the forces are contained within the input shaft 12.

A compound gear set 90 is disposed between the output discs 70, 72. The gear set 90 has a sun gear 92 splined to an output sleeve 94, a ring gear 96 secured to the housing 88 through a frame 98 which also supports the assemblies 77, 79 and a planetary carrier assembly 100. The planetary carrier assembly has a plurality of intermeshing pinion gears 102, 104 which mesh with the sun gear 92 and the ring gear 96 respectively. The pinion gears 102, 104 are rotatably mounted on respective pins 106, 108 that are secured in side plates 110, 112. The side plate 110 has an inner splined hub 114 that is drivingly connected with the output disc 70 and the side plate 112 is drivingly connected with the output disc 72. The output discs 70, 72 rotate in unison with the carrier assembly 100. The sun gear 92 rotates in unison with the sun gear 38 due to the connection with the sleeve shaft 94.

Power is transmitted to the CVU 16 from the engine 22 through the input shaft 12. Power is transmitted from the CVU 16 through the compound gear set 90 along the sleeve shaft 94 and into the summing differential 18. The power is then transferred from the summing differential 18 through the engaged clutch 20 and into the output shaft 14. The input shaft 12, the sleeve shaft 94 and the output shaft 14 are co-axially aligned. The output speed of the CVT 10 depends on the individual speeds of the sun gear 38 and carrier assembly 32 of the summing differential gear set 18. The carrier assembly 32 is rotated at the speed of the engine 22 and the sun gear 38 is rotated at the speed of the sun gear 92 which is dependant on the ratio of the CVU 16.

When the CVU 16 is set to provide a maximum underdrive ratio, the output speed of the CVT 10 will be at a maximum reverse speed. When the CVU 16 is set to provide a maximum overdrive ratio, the output speed of the CVT will be at a maximum forward speed. Depending on the tooth ratios (ring gear teeth divided by sun gear teeth) in the compound gear set 90 and the summing differential gear set 18, the CVT will have a neutral condition. The selection of the tooth ratios determines the maximum overall ratio in both the forward and reverse directions as well as the positioning of the neutral condition. For example if:

Maximum underdrive CVU ratio equals 3.00
Maximum overdrive CVU ratio equals 0.33
Ring 96/Sun 92 tooth ratio equals 1.90
Ring 40/Sun 38 tooth ratio equals 1.49
Maximum forward ratio equals 1.47
Maximum reverse ratio equals −0.10.

It will be obvious to those skilled in the art that the above ratios can be changed to provide the maximum benefits for a given powertrain. Therefore these values should not be considered as limiting.

The output shaft 14 is selectively connectable with the ring gear 40 through the selectively engageable clutch 20 as described above. The use of the clutch 20 provides the transmission with a true neutral condition. This allows the vehicle utilizing this powertrain to be towed if necessary. By controlling the slipping engagement of the clutch 20, the CVU 16 will be synchronized at the proper ratio after the engine is started. Once the proper ratio is achieved in the CVU, the clutch 20 is fully engaged to provide a substantially solid drive connection.

What is claimed is:

1. A continuously variable transmission comprising:

an input shaft;

an output shaft aligned co-axially with said input shaft;

a continuously variable unit having spaced input members, output members disposed between said input members, transfer means tractionally engaged between respective pairs of said input members and said output members for transferring power therebetween;

a central planetary gear set disposed between said output members including a first member drivingly connected with said output members, a second member drivingly connected with a CVU output shaft and a third member providing a reaction member in said central planetary gear set, said CVU output shaft being concentric with said input shaft and co-axially aligned with said output shaft;

a summing differential planetary gear set having a first member drivingly connected between said input shaft and one input member of said continuously variable unit, a second member drivingly connected with said CVU output shaft and a third member; and power transmitting means comprising a selectively engageable clutch for drivingly connecting said third member of said summing differential with said output shaft.

2. The continuously variable transmission defined in claim 1 further comprising:

means for applying a normal force to said CVU co-axial with said input shaft; and reaction means on said input shaft for cooperating with said CVU to contain the applied normal force within the input shaft and the CVU.

3. The continuously variable transmission defined in claim 1 further comprising:

said first member of said central planetary gear set comprising a carrier assembly having a plurality of first and second intermeshing pinion gears rotatably mounted thereon, said second member of said central planetary gear set comprising a sun gear meshing with said first pinion gears and said third member of said central planetary gear set comprising a ring gear connected with a stationary member of said continuously variable transmission and meshing with said second pinion gears.

4. The continuously variable transmission defined in claim 2 further comprising:

said first member of said summing differential planetary gear set comprising a carrier assembly having means for transmitting an applied normal force to one of said input members and reacting against said reacting means.

5. The continuously variable transmission defined in claim 4 further comprising:

said means for applying said normal force being directly active on another of said input members to transmit a normal force thereto and reacting against said reacting means to transmit said normal force through said input shaft and said reacting means to said carrier assembly of said summing differential planetary gear set.

* * * * *